J. W. WILKINSON.
LIQUID-MEASURE.

No. 178,573. Patented June 13, 1876.

WITNESSES: A. B. Richmond
S. Newton Pettis

INVENTOR: John W. Wilkinson

UNITED STATES PATENT OFFICE.

JOHN W. WILKINSON, OF MEADVILLE, PENNSYLVANIA.

IMPROVEMENT IN LIQUID-MEASURES.

Specification forming part of Letters Patent No. 178,573, dated June 13, 1876; application filed February 29, 1876.

*To all whom it may concern:*

Be it known that I, JOHN WRIGHT WILKINSON, of Meadville, in the county of Crawford, State of Pennsylvania, have invented a new and Improved Device for Measuring Fluids, which device is described in the following specification, reference being had to the accompanying drawings and the letters of reference marked thereon.

The object of my invention is to construct a device for measuring oils and other fluids without handling openly, so as to be in danger of fire or accident, and also to combine in one device a mode or measure which will measure the smallest fraction of an ounce or a gallon or more with accuracy.

Figure 1:
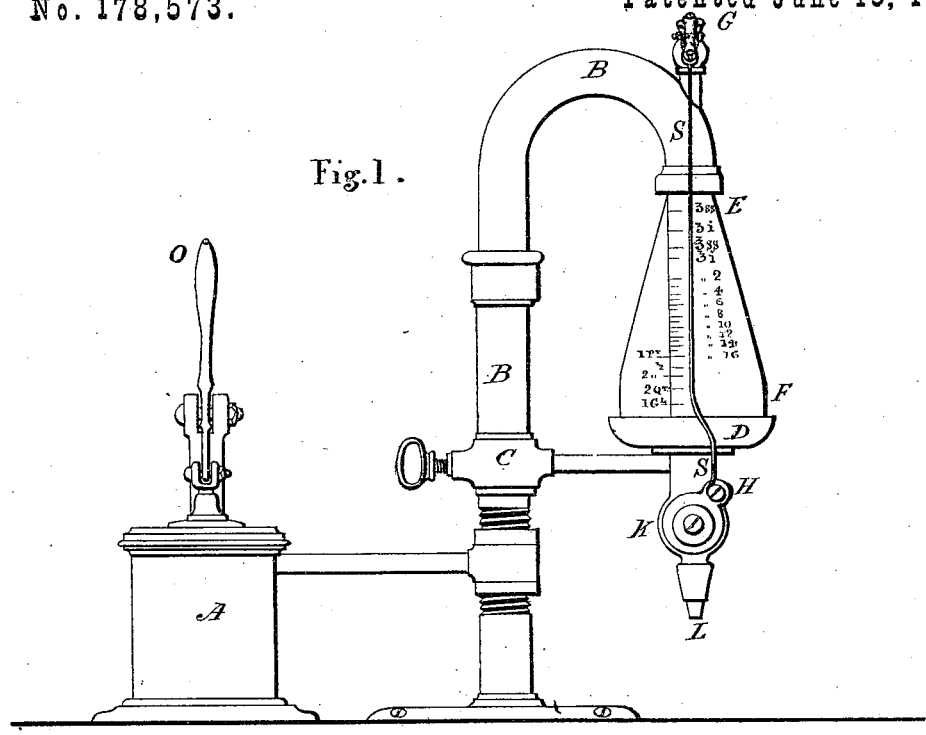
Figure 2:
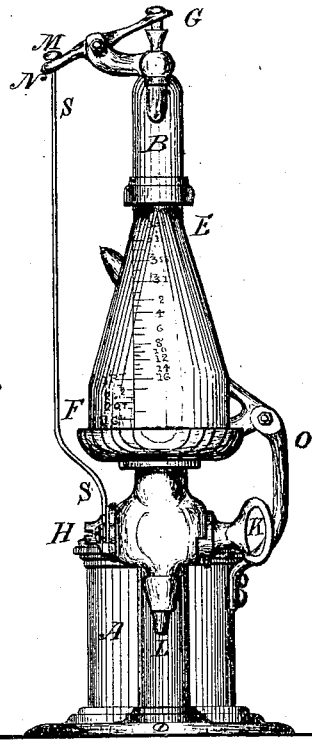

Figure 1 represents a side view of my invention.

A is a pump, connected with the cask that contains the fluid to be measured, (as oil in a retail store.) This pump may be either on or under the counter, or there need be no pump if the cask is placed higher than the measure, so that the fluid will run into it from the cask by turning a stop-cock. B, Fig. 1, represents a tube leading from the pump or cask. This tube has a foot on the bottom, by which it is securely screwed to the counter-top. It is bent like a siphon at the top. C is a slide on the tube, which may be adjusted to any desired position by a set-screw. This slide C has an arm, to which is attached a cup or platform, D, to support the measure E F. E F is the measure, and is made of strong glass, and is made like a cone in shape. The base of this conical measure rests on the platform D, and there is a tube from the bottom stopped by a stop-cock, K L.

The top or apex of the measure is connected with the tube B. This measure is marked with a graduated scale from the top, and may be marked to represent ounces, drams, or fractions thereof, or in gills, pints, quarts, and gallons, as may be desired—the narrow top, which may be extended so as to leave a very small orifice on the inside, being marked to register the lesser quantities, and the bottom the larger.

G is a valve, with a rod, S, connected with a short crank, H, on the plug of the stop-cock K L, so that when the stop-cock is opened to draw off the fluid at L the valve G is opened and air let in at the top of the measure. The rod S passes through the valve-lever N, and has a button, M, on the end.

By this construction it will be seen that while the stop-cock K L cannot be opened without opening the valve G, yet the valve can be opened without opening the stop-cock. When the measure E F is being filled by pumping the fluid into it, the air will open the valve G and escape; the valve will then close and prevent evaporation.

It will be seen that by this device the smallest quantities of fluid can be measured, as well as the larger quantities. The fraction of a gill will lower the top of the fluid (when drawn off) in the small apex of the measure as much as a gallon will in the larger bottom.

What I claim as my invention is as follows, to wit:

1. The combination of the rod S and lever N with the valve G and measuring-glass E F, all arranged to operate so that the valve G will open to permit of the escape of air as the measure is being filled, as set forth.

2. The combination of the rod S, lever N, and valve G with the stop-cock K L, arranged to operate so that when the latter is turned to discharge the contents of the measure the valve G will be opened to admit air into the measuring-glass, as set forth.

JOHN W. WILKINSON.

Witnesses:
A. B. RICHMOND,
S. NEWTON PETTIS.